C. F. KLEINSTEUBER.
Lever-Balance.
No. 212,559.  Patented Feb. 25, 1879.
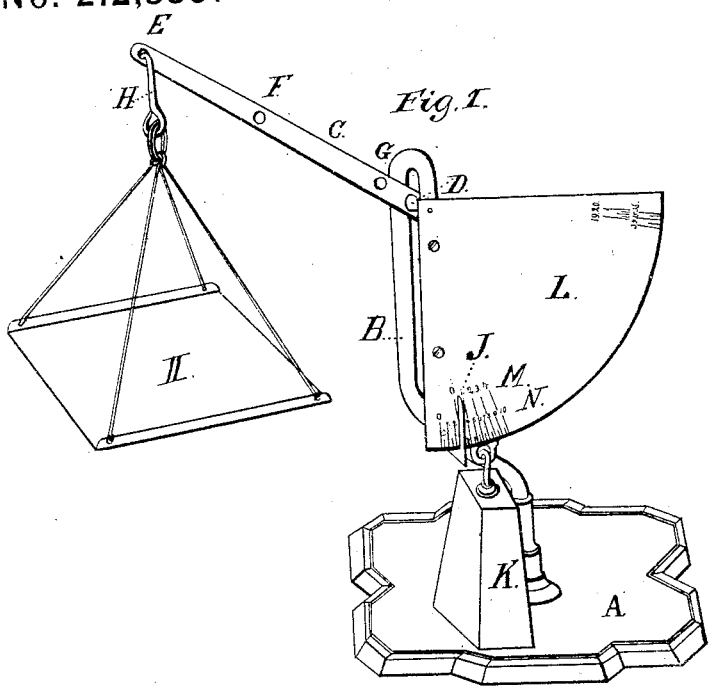
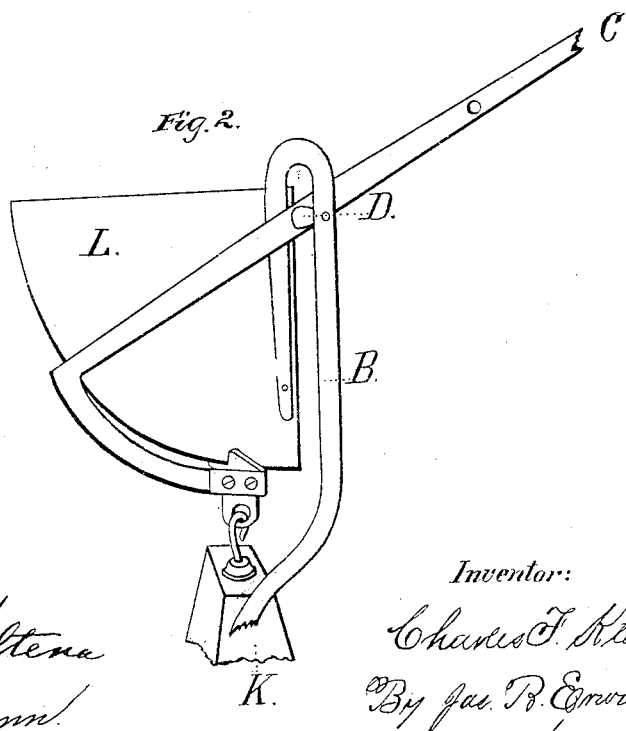

UNITED STATES PATENT OFFICE.

CHARLES F. KLEINSTEUBER, OF MILWAUKEE, WISCONSIN.

IMPROVEMENT IN LEVER-BALANCES.

Specification forming part of Letters Patent No. 212,559, dated February 25, 1879; application filed November 15, 1878.

*To all whom it may concern:*

Be it known that I, CHARLES F. KLEINSTEUBER, of the city of Milwaukee, in the county of Milwaukee and State of Wisconsin, have invented certain new and useful Improvements in Lever Balances and Scales; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 of the accompanying drawings represents a perspective view of my invention. Fig. 2 represents a perspective rear view of the same.

My invention relates to an improvement in lever balances and scales; and it consists in certain improvements therein, hereinafter more fully set forth, and pointed out in the claim.

In the accompanying drawings, A represents a substantial platform, to which the standard B is secured in a rigid vertical position. The standard B supports the scale-bar C, which is secured thereto by the pivot D, upon which it oscillates freely upward and downward. The scale-bar is provided with eyes E, F, and G for the reception of the hook H of the scale-pan I. The scale-bar C is bent downward, as seen in Fig. 2, so that the scale-pointer J and counterpoise K, which are attached thereto, will stand at zero upon the scale when the scale-pan is empty. L is the scale-plate, which is rigidly attached to the standard B. M represents the scale upon which light weights, in pounds and fractions thereof, are indicated when the scale-pan is attached at F. N represents the scale upon which heavy weights are indicated in pounds and fractions thereof when the scale-pan is attached at G. The scale N may also indicate the number of ounces and fractions of ounces of a light weight when the scale-pan is attached at E.

The standard B may be attached to a post or any stationary object, or suspended from the ceiling, as convenience requires, in which case the platform A may be dispensed with.

The counterpoise K may be detached from the scale-bar and substituted by a lighter or heavier counterpoise, if desired, thereby increasing the capacity of the device for weighing both heavier and lighter weights.

It is obvious that the scale may be duplicated upon the back side of the scale-plate; that the weight of an object may be seen from either side; also, that the device may be constructed with the scale-plate upon the left of the standard, the other parts being also changed to sustain the same relative position thereto.

When the weight is placed upon the scale-pan I the short arm of the scale-bar C is thrown upward with the pointer J, which moves over the scale until the weight and counterpoise find their equilibrium, when it remains at rest, thus indicating upon the scale the correct weight of the object weighed in pounds or ounces, or fractions thereof, as the case may be.

I am aware that scale-beams have heretofore been provided with two or more places for attaching the scale-pan, and that a scale-plate has heretofore been constructed with two sets of graduations, indicating pounds and fractions thereof, and I therefore lay no claim to such devices.

Having thus described my invention, what I claim as new, and desire to secure by Letters Patent, is—

The combination of the standard B, bent at its upper end to form the journal-bearings of the scale-beam, with the bent scale-beam C, provided with two or more perforations for the attachment of the scale-pan, stationary scale-plate L, attached to the bent end of the standard and provided with two sets of graduations thereon, bent pointer I, attached to the lower bent end of the scale-beam and indicating the weight in pounds and fractions thereof, detachable counterpoise K, and removable pan I, capable of being attached to the scale-beam at different points, the whole arranged, constructed, and operating in the manner and for the purposes set forth.

In testimony that I claim the foregoing as my own I affix my signature in presence of two witnesses.

CHARLES F. KLEINSTEUBER.

Witnesses:
JAS. B. ERWIN,
J. B. BUTTERFIELD.